United States Patent [19]
Whitehurst

[11] Patent Number: 5,530,680
[45] Date of Patent: Jun. 25, 1996

[54] FEATURE LOCATION AND DISPLAY APPARATUS

[75] Inventor: Philip D. Whitehurst, Poole, United Kingdom

[73] Assignee: Echopilot Limited, Hampshire, England

[21] Appl. No.: 211,614

[22] PCT Filed: Oct. 12, 1992

[86] PCT No.: PCT/GB92/01869

§ 371 Date: Apr. 11, 1994

§ 102(e) Date: Apr. 11, 1994

[87] PCT Pub. No.: WO93/07506

PCT Pub. Date: Apr. 15, 1993

[30]    Foreign Application Priority Data

Oct. 11, 1991 [GB] United Kingdom ............ 9121615

[51] Int. Cl.$^6$ ................................................. G01S 15/89
[52] U.S. Cl. ............................................................ 367/99
[58] Field of Search .......................... 367/99, 124, 125

[56] References Cited

U.S. PATENT DOCUMENTS

| | | | |
|---|---|---|---|
| 3,392,392 | 7/1968 | Magnuski | 367/125 |
| 3,618,007 | 11/1971 | Anderson | 367/125 |
| 3,633,205 | 1/1972 | Lee et al. | 342/444 |
| 4,333,170 | 6/1982 | Mathews et al. | 367/125 |
| 4,988,996 | 1/1991 | Ito | 340/984 |
| 5,070,484 | 12/1991 | Mantel | 367/124 |

FOREIGN PATENT DOCUMENTS

| | | |
|---|---|---|
| AO116777 | 8/1984 | European Pat. Off. . |
| 0116777B | 3/1990 | European Pat. Off. . |
| 2096854 | 10/1982 | United Kingdom . |
| 2140558 | 12/1983 | United Kingdom . |
| 2197952 | 6/1988 | United Kingdom . |

OTHER PUBLICATIONS

"A Sideways–Looking Towed Depth–Measuring System", Institute of Navigation, Sep. 1982, vol. 35, No. 3.
"A Digital Phase Delay Compensating Beam–Forming Scheme For Ultrasonic Imaging", Japanese Journal of Applied Physics, vol. 27, 1988, Supplement 27-1, pp. 215–217.

Primary Examiner—Daniel T. Pihulic
Attorney, Agent, or Firm—Lowe, Price, LeBlanc & Becker

[57] ABSTRACT

Echo sounding apparatus mounted on a boat (52) comprises a transducer unit (1) connected to a display device (2) which contains a control and processing circuit (53) via a cable (3). Sound pulses reflected from features below the keel and in front of the bow of the boat (52) are processed to generate first and second location signals. The first location signal defines an unambiguous feature position with low angular accuracy. The second location signal defines possible feature positions with high angular accuracy. The first and second location signals are combined to define an unambiguous feature position with high angular accuracy. The results are displayed in a vertical cross section of features and water in the correct positions relative to a scale picture (10) of the boat (52).

36 Claims, 13 Drawing Sheets

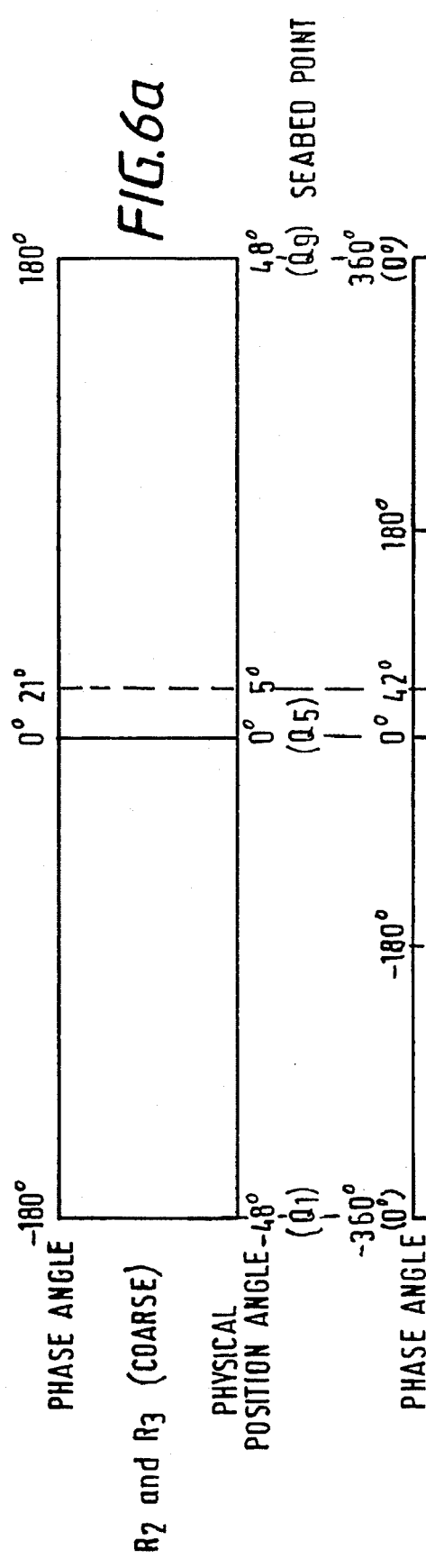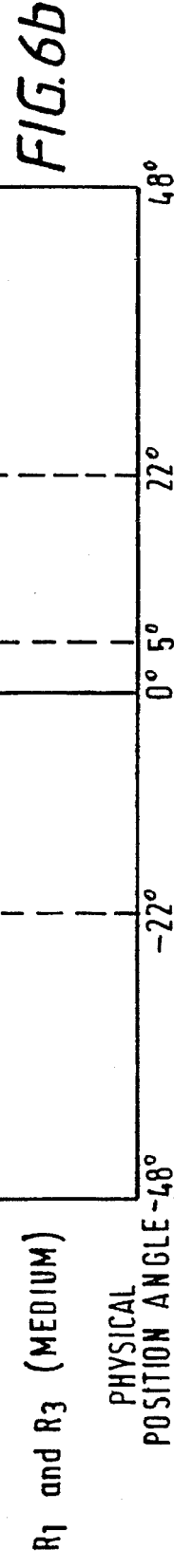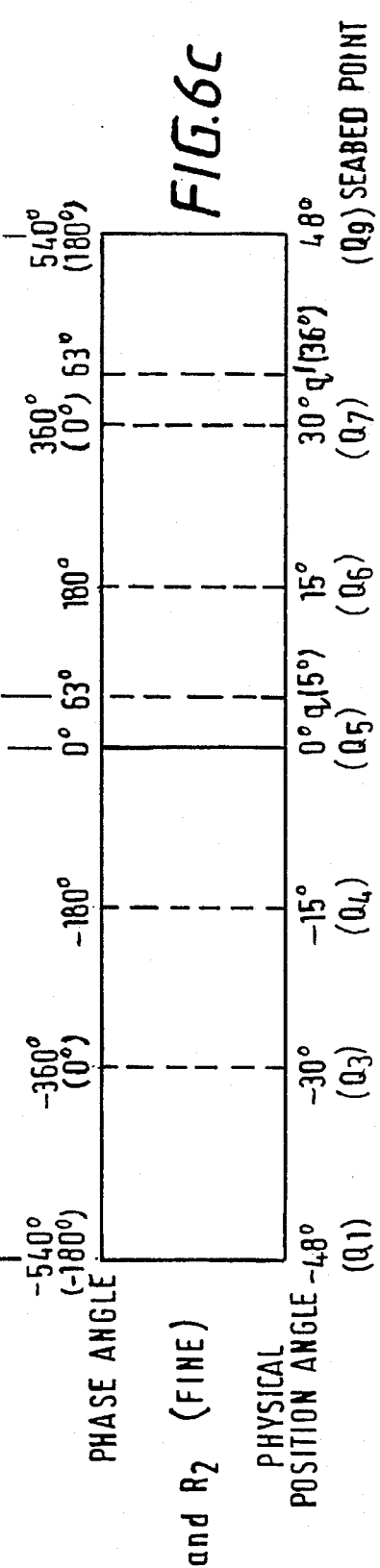

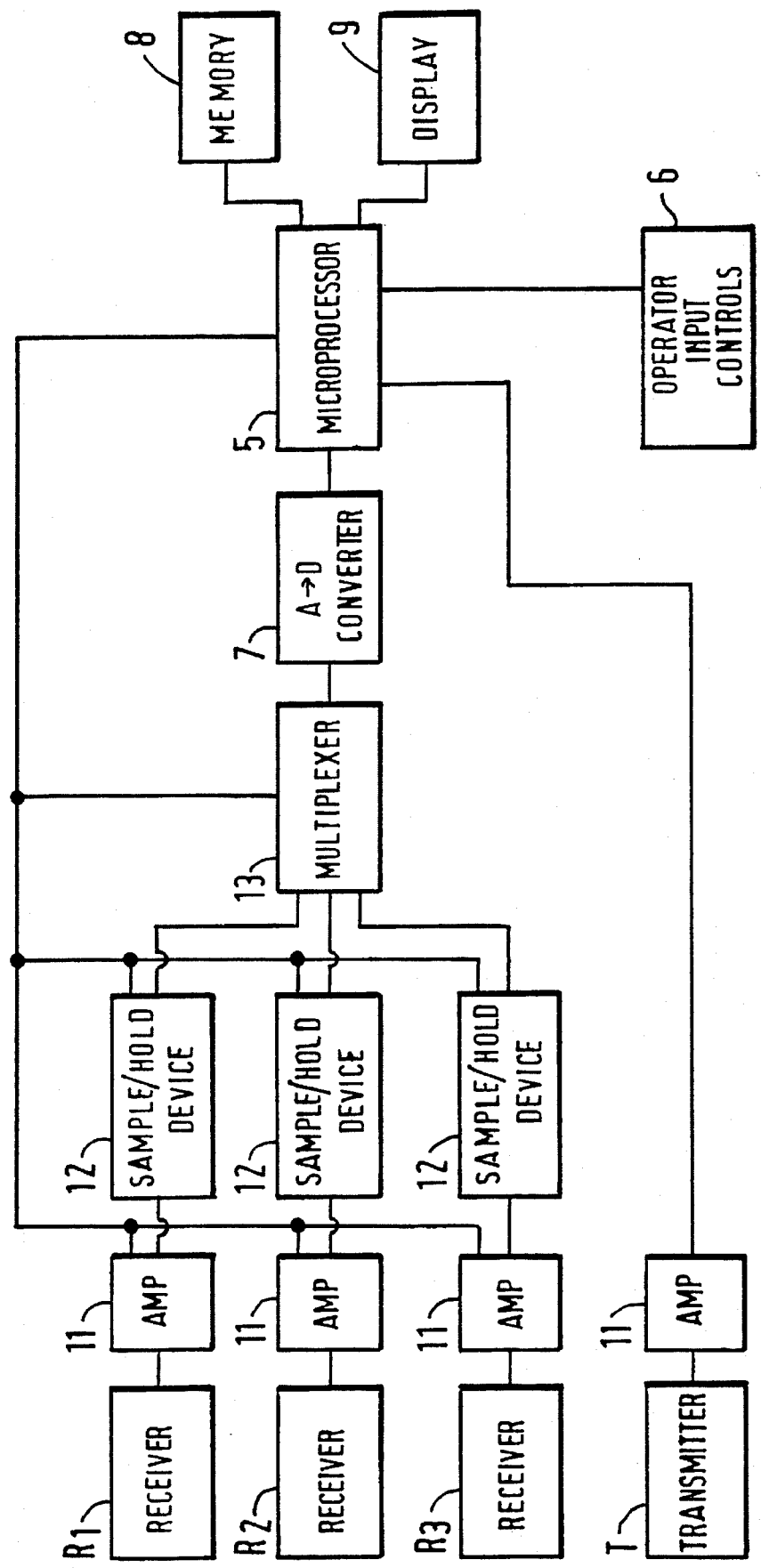

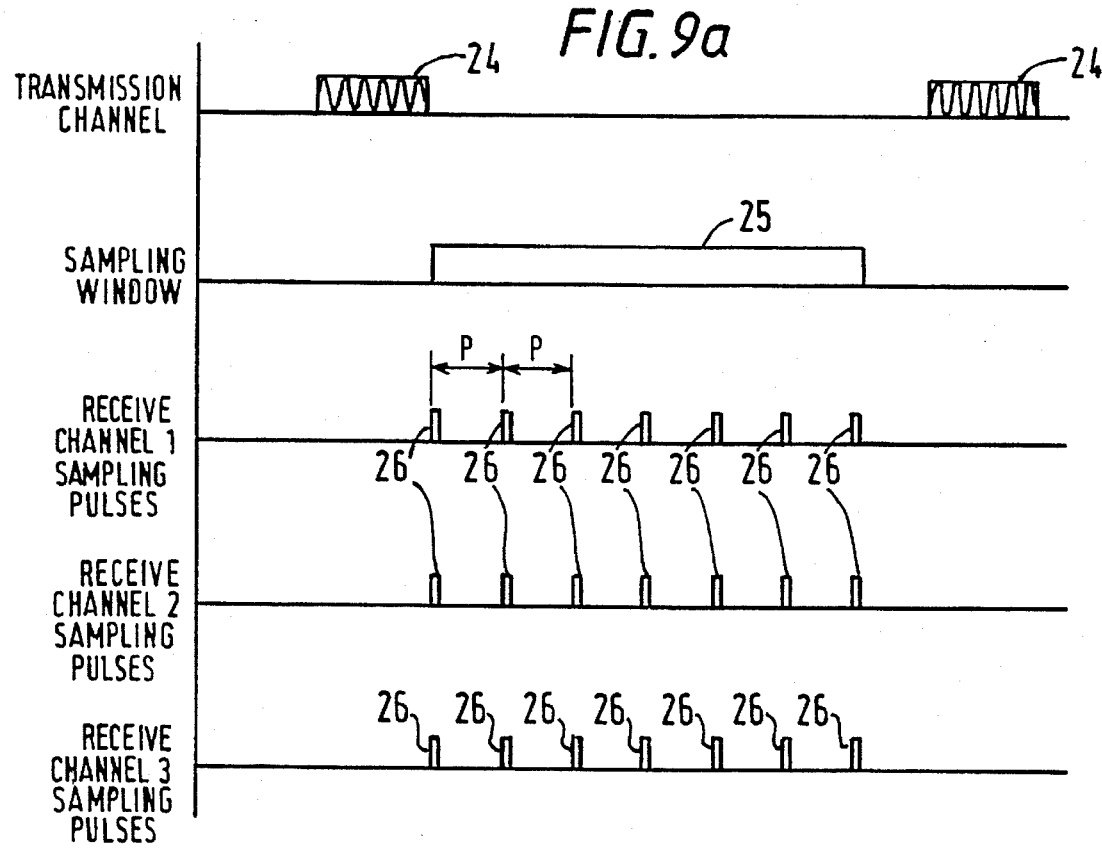
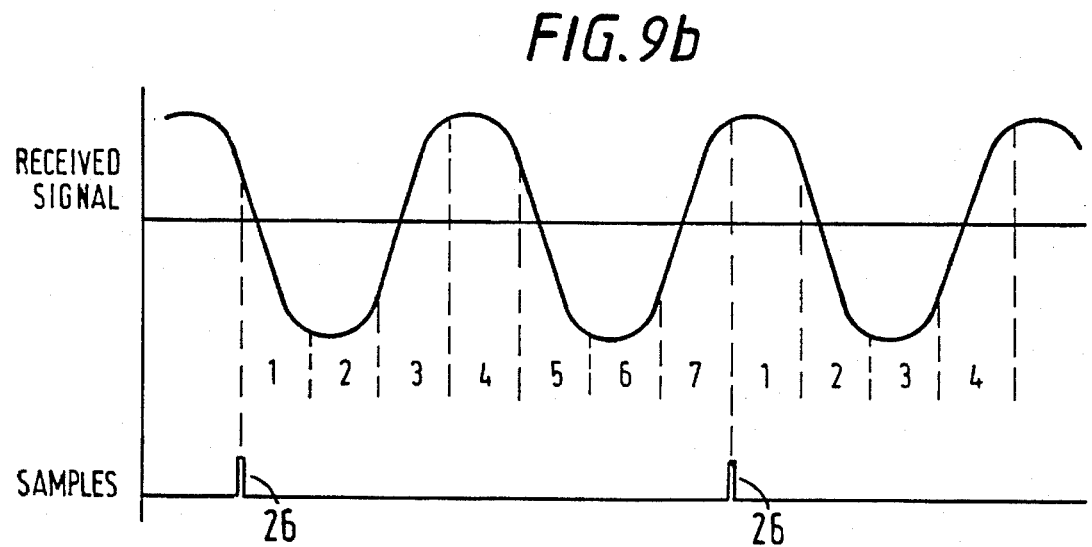

FIG. 11

27 — ADD MODULI OF NEXT PAIR OF SUCCESSIVE SAMPLES IN A GIVEN CHANNEL. REPEAT FOR CORRESPONDING SAMPLES IN OTHER CHANNELS.

28 — DO ALL 3 RESULTS OF THE ADDITION LIE ABOVE A GIVEN THRESHOLD VALUE? — NO (loop back)

YES ↓

29 — CONVERT EACH PAIR OF SAMPLES TO A PHASE ANGLE $\phi_{R1}, \phi_{R2}, \phi_{R3}$

30 — CALCULATE:
$\phi\text{-FINE} = \phi_{R1} - \phi_{R2}$
$\phi\text{-MEDIUM} = \phi_{R1} - \phi_{R3}$
$\phi\text{-COARSE} = \phi_{R3} - \phi_{R2}$

31 — CALCULATE NORMALISED ABSOLUTE PHASE ANGLES $\alpha\text{-FINE}$ AND $\alpha\text{-MEDIUM}$ $\alpha\text{-FINE}, \alpha\text{-MEDIUM}$

32 — IS DIFFERENCE BETWEEN $\alpha\text{-FINE}$ AND $\alpha\text{-MEDIUM}$ BELOW A GIVEN THRESHOLD VALUE? — NO

YES ↓

33 — TAKE AVERAGE OF $\alpha\text{-FINE}$ AND $\alpha\text{-MEDIUM}$ $\alpha\text{-AVERAGE}$

34 — CONVERT $\alpha\text{-AVERAGE}$ TO PHYSICAL ANGLE $\theta$ USING 1:1 RELATIONSHIP AND STORE $\theta$

35 — ARE THERE ANY REMAINING UNPROCESSED SAMPLES? — YES (loop back)

| ∅-FINE POSITIVE | | ∅-FINE NEGATIVE | |
|---|---|---|---|
| ∅-COARSE QUANTISED VALUE | ADDITION COMPONENT | ∅-COARSE QUANTISED VALUE | ADDITION COMPONENT |
| -15 | -360° | -15 | -360° |
| -14 | -360° | -14 | -360° |
| -13 | -360° | -13 | -360° |
| -12 | -360° | -12 | -360° |
| -11 | -360° | -11 | -360° |
| -10 | -360° | -10 | -360° |
| -9 | -360° | -9 | -360° |
| -8 | -360° | -8 | -360° |
| -7 | -360° | -7 | 0 |
| -6 | -360° | -6 | 0 |
| -5 | -360° | -5 | 0 |
| -4 | -360° | -4 | 0 |
| -3 | 0 | -3 | 0 |
| -2 | 0 | -2 | 0 |
| -1 | 0 | -1 | 0 |
| 0 | 0 | 0 | 0 |
| 1 | 0 | 1 | 0 |
| 2 | 0 | 2 | 0 |
| 3 | 0 | 3 | 0 |
| 4 | 0 | 4 | 360° |
| 5 | 0 | 5 | 360° |
| 6 | 0 | 6 | 360° |
| 7 | 0 | 7 | 360° |
| 8 | 360° | 8 | 360° |
| 9 | 360° | 9 | 360° |
| 10 | 360° | 10 | 360° |
| 11 | 360° | 11 | 360° |
| 12 | 360° | 12 | 360° |
| 13 | 360° | 13 | 360° |
| 14 | 360° | 14 | 360° |
| 15 | 360° | 15 | 360° |

54 (left table), 55 (right table)

FIG.13b.

| Ø-MEDIUM POSITIVE | | Ø-MEDIUM NEGATIVE | |
|---|---|---|---|
| Ø-COARSE QUANTISED VALUE | ADDITION COMPONENT | Ø-COARSE QUANTISED VALUE | ADDITION COMPONENT |
| -15 | -360° | -15 | 0 |
| -14 | -360° | -14 | 0 |
| -13 | -360° | -13 | 0 |
| -12 | -360° | -12 | 0 |
| -11 | -360° | -11 | 0 |
| -10 | -360° | -10 | 0 |
| -9 | -360° | -9 | 0 |
| -8 | -360° | -8 | 0 |
| -7 | -360° | -7 | 0 |
| -6 | -360° | -6 | 0 |
| -5 | -360° | -5 | 0 |
| -4 | 0 | -4 | 0 |
| -3 | 0 | -3 | 0 |
| -2 | 0 | -2 | 0 |
| -1 | 0 | -1 | 0 |
| 0 | 0 | 0 | 0 |
| 1 | 0 | 1 | 0 |
| 2 | 0 | 2 | 0 |
| 3 | 0 | 3 | 0 |
| 4 | 0 | 4 | 0 |
| 5 | 0 | 5 | 360° |
| 6 | 0 | 6 | 360° |
| 7 | 0 | 7 | 360° |
| 8 | 0 | 8 | 360° |
| 9 | 0 | 9 | 360° |
| 10 | 0 | 10 | 360° |
| 11 | 0 | 11 | 360° |
| 12 | 0 | 12 | 360° |
| 13 | 0 | 13 | 360° |
| 14 | 0 | 14 | 360° |
| 15 | 0 | 15 | 360° |

56

57

FEATURE LOCATION AND DISPLAY APPARATUS

This invention relates to the location and display of features, and is primarily concerned with underwater echosounding apparatus.

In underwater echosounding, the location of each feature (for example each point on the seabed) is defined by two parameters; a range, r, from the apparatus and an angle, $\theta$, from a specified direction to the apparatus. Echosounding apparatus comprises means for transmitting and receiving a pulsed signal, and processing signals derived from the received pulses which have been reflected by a feature to determine r and $\theta$.

An example of a known feature location technique for use in underwater echosounding is the use of a phased array, in which a multitude of receivers are connected to a processor via variable delay lines. The processor adjusts the delays on the delay lines until the signals from each receiver produced by reflected pulses are in phase. By measuring the time delay on each delay line, the direction of arrival of the pulse, that is the angular direction $\theta$ of the reflecting feature, can be determined. Such a technique requires a multitude of receivers which occupy a large physical area, and involves complex signal processing to determine the angular direction $\theta$.

Another technique for use in mapping surveys of the seabed is disclosed in a paper by Cloet et al entitled "A Sideways-Looking Towed Depth-Measuring System" published in the journal of the Institute of Navigation, September 1982, Volume 35, No. 3. In this technique, three receivers with a wide space (relative to the wavelength of the received signal) are used to produce two feature location signals. Each location signal define the range r of the reflecting feature to high accuracy and the angular location $\theta$ to high accuracy, but does not define a single feature location, that is the absolute position of the feature is ambiguous since there are a number of different angular positions which would result in identical location signals. Each of the two feature location signals produced by the receivers is used to produce a trace. The traces are then compared in the manner of a vernier scale to identify a single position for the reflecting feature. The technique taught by Cloet et al is primarily for use in survey applications, in which the data collected can be processed in slow-time, for example in the laboratory, to produce a map of the seabed. Such a technique is therefore of no practical value for navigation purposes where real-time information on submerged features etc is required. In addition, the use of vernier scale processing means that the technique suffers from errors in the calculated feature position caused by noise.

GB 2197952A teaches a further technique. Two receivers separated by a wide space (relative to the wavelength of the received signal) and two or more transmitting frequencies are used to generate two (or more) location signals, one for each frequency, each location signal defining the range r of the reflecting feature to high accuracy and a number of possible angular locations of the feature to high accuracy. These location signals are combined to uniquely define the position of the reflecting feature. Such a technique, however, requires careful signal filtering and complex signal processing due to the two or more transmitted frequencies.

It is usual to display the processed signals from the receivers on a chart recorder.

One aspect of the present invention relates to a novel apparatus to determine the angular location of a feature. First and second feature location signals are generated. One location signal defines an unambiguous angular position of the feature with low angular accuracy. The other location signal defines possible feature angular locations with high angular accuracy. The location signals are compared to uniquely identify the angular position of the reflecting feature with high angular accuracy.

In one preferred embodiment, as described herein, three receivers are used to generate the first and second feature location signals. First and second receivers are separated by a relatively small distance (preferably less than a wavelength of the received signal) and a third receiver is separated from these by a relatively large distance (preferably more than two wavelengths of the received signal). The first and second receivers produce signals which are processed to derive a feature location signal which defines an unambiguous feature angular position with low angular accuracy. The first and third receivers produce signals which are processed to derive a feature location signal which defines possible feature angular locations with high angular accuracy.

A second aspect of the present invention concerns a novel apparatus for displaying the location of features determined by the apparatus. The features are shown pictorially in a cross-section of the water and features. In a preferred embodiment, the cross-section is a plane projecting downwards from the keel of the boat and forwards beyond the bow.

A third aspect of the present invention concerns the representation of scale information in the display of the features. A scale picture representing the boat on which the echosounding apparatus is mounted is shown on the display of the features. This assists an observer in relating ranges of features to a known physical length, that is boat lengths.

The invention is described further by way of example with reference to the accompanying drawings in which:

FIG. 1a is a diagramatic plan view of the boat shown in FIG. 1;

Figure 8:
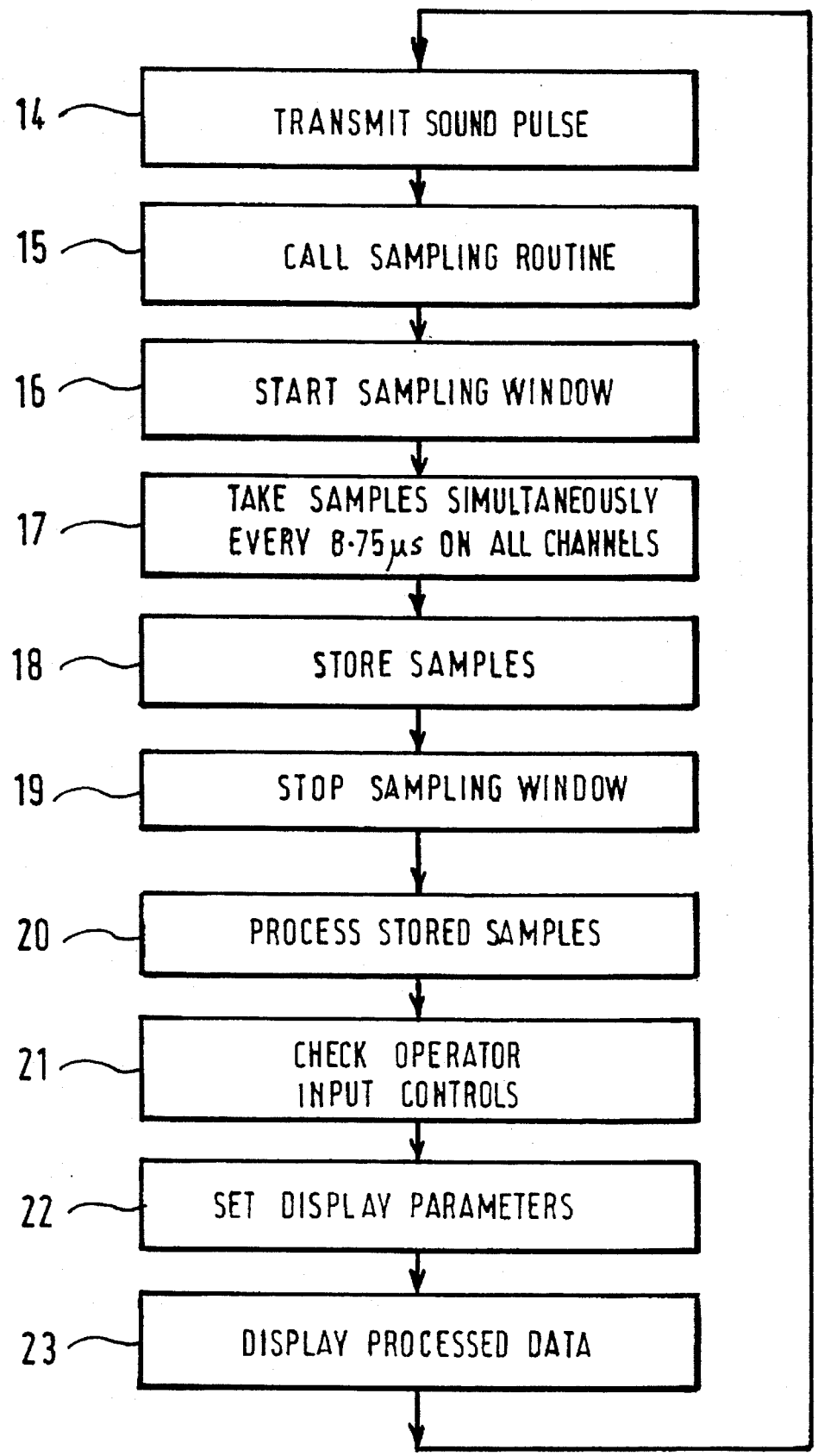
Figure 10:
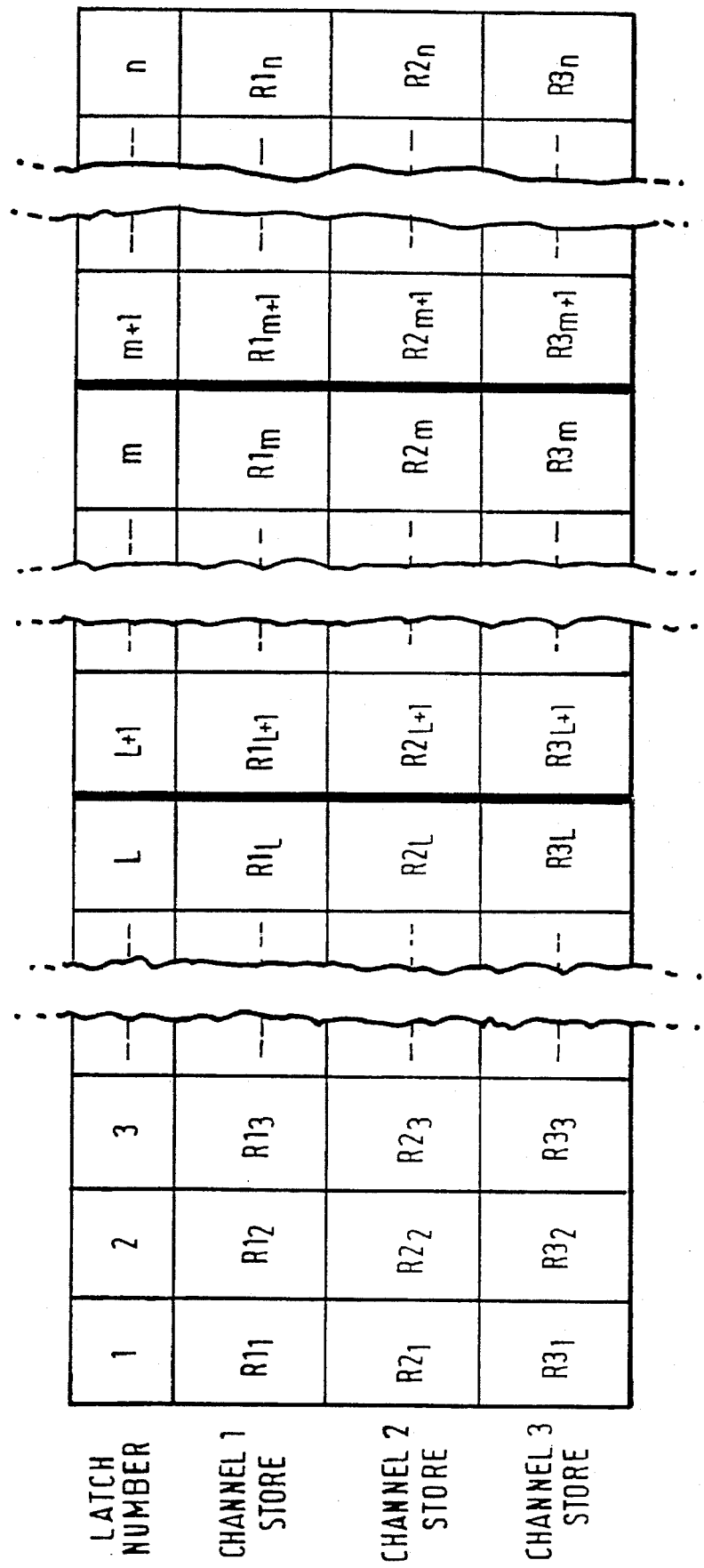
Figure 12:
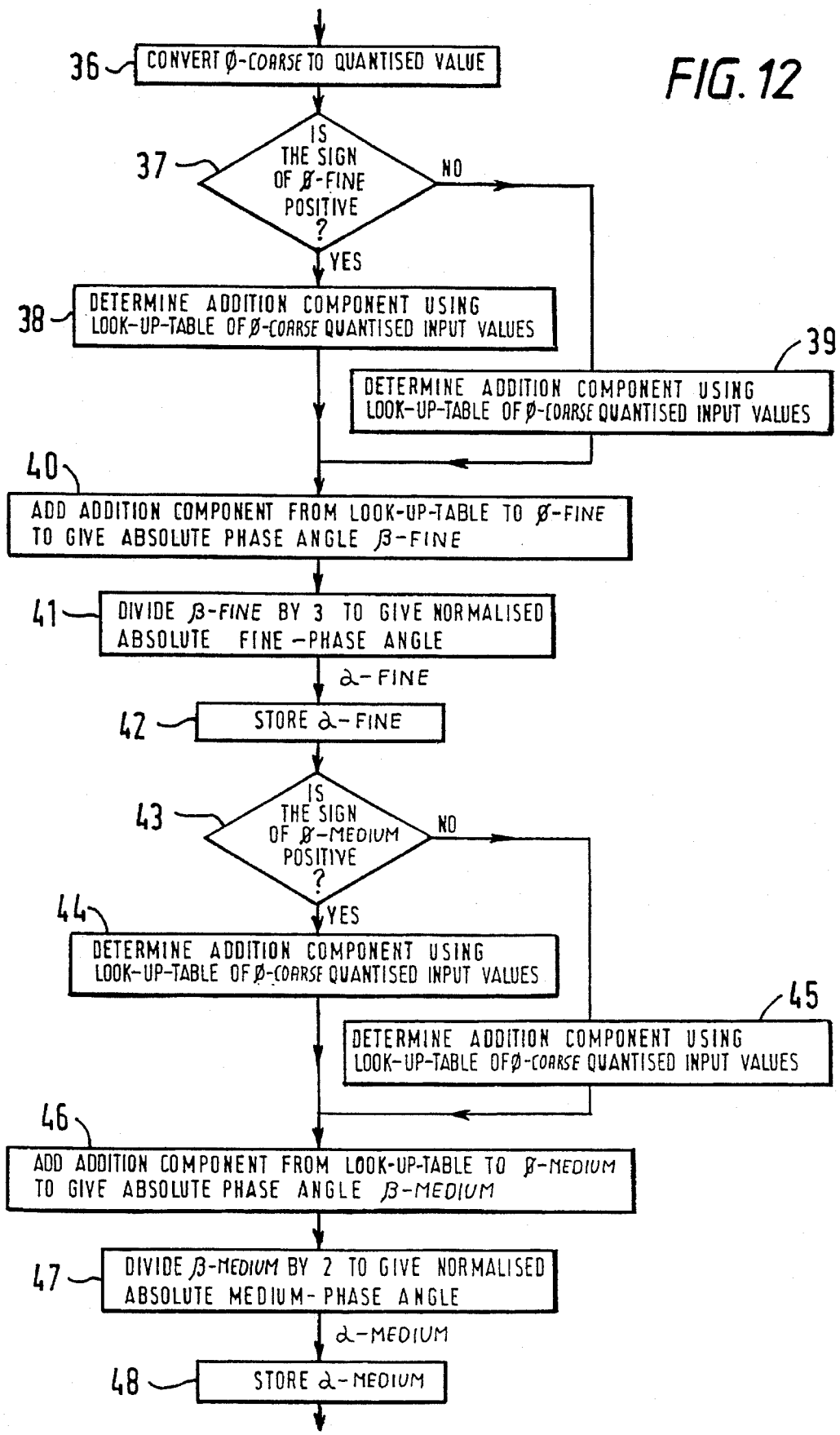

FIGS. 6a–c is a diagram showing the relationships between signal phase and feature location angle;

FIG. 7 is a block diagram of the apparatus components;

FIG. 8 is a first flow chart of the processing operations;

FIGS. 9a–b is a diagram illustrating the sampling process;

FIG. 10 is a schematic diagram illustrating the storage of pulse samples;

FIG. 11 is a second flow chart of the processing operations;

FIG. 12 is a third flow chart of the processing operations; and

FIGS. 13a–b is a set of look-up tables used during processing in the embodiment.

Figure 1:
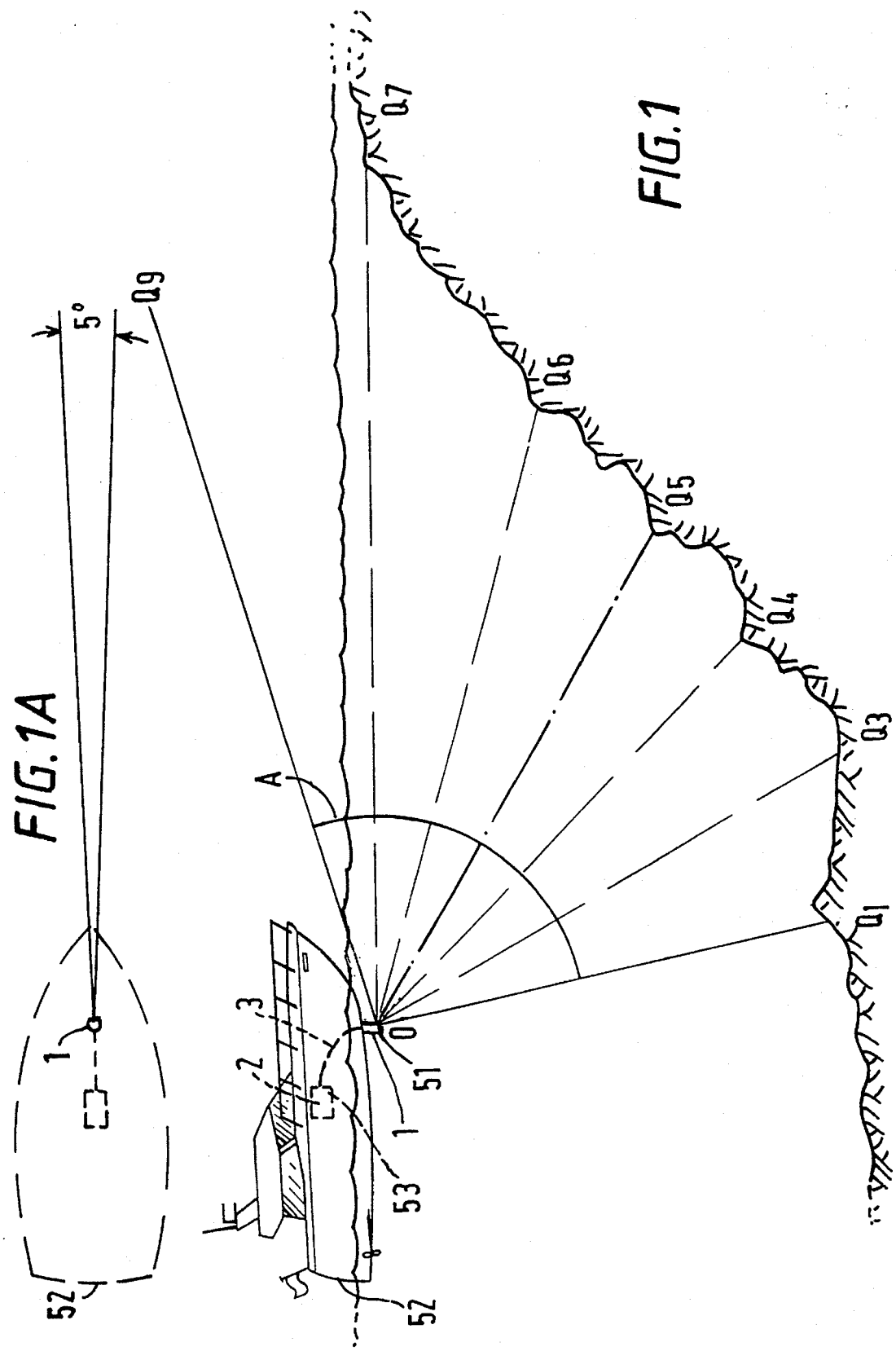
FIG. 1 shows the echosounding apparatus mounted on a boat.

With reference to FIG. 1, the echosounding apparatus is shown mounted on a boat 52. The apparatus comprises a transducer unit 1 fitted on the underside of the boat 52 and a display device 2 which contains a control and processing circuit 53 connected to the transducer unit 1 via a cable 3. In operation, the control and processing circuit 53 drives the transducer unit 1 which outputs pulses of high frequency (for example 200 kHz), narrow bandwidth sound, which diverge in the vertical plane so that the pulse signal is transmitted in a broad arc A which extends both downwards below the keel of the boat 52 and forwards beyond the bow. In the embodiment, the transducer unit 1 is constructed and arranged so that arc A extends to an angle of ±48° about a line OQ5 normal to a surface 51 of the transducer unit 1. The output pulses also diverge in the horizontal plane but with a narrow angle of divergence which in the embodiment is approximately 5° as shown in FIG. 1A. Thus, the sound pulses are incident on submerged features both below and infront of the boat 52, which reflect the pulses back to the transducer unit 1 where they are received and then processed by the control and processing circuit 53 to determine the range r and angular direction θ of the features from the transducer unit 1. The range r is determined on the basis of the time interval between the output of a sound pulse and the receipt of the reflected pulse. The angular direction θ is determined as will be described herein later. By way of example, FIG. 1 shows seven points Q1, Q3, Q4, Q5, Q6, Q7 and Q9 lying in the path of the output sound pulses. Points Q1, Q3, Q4, Q5, Q6 and Q7 are on the seabed and the lines shown connecting these with the transducer unit 1 represent the paths taken by reflected pulses.

Figure 2:
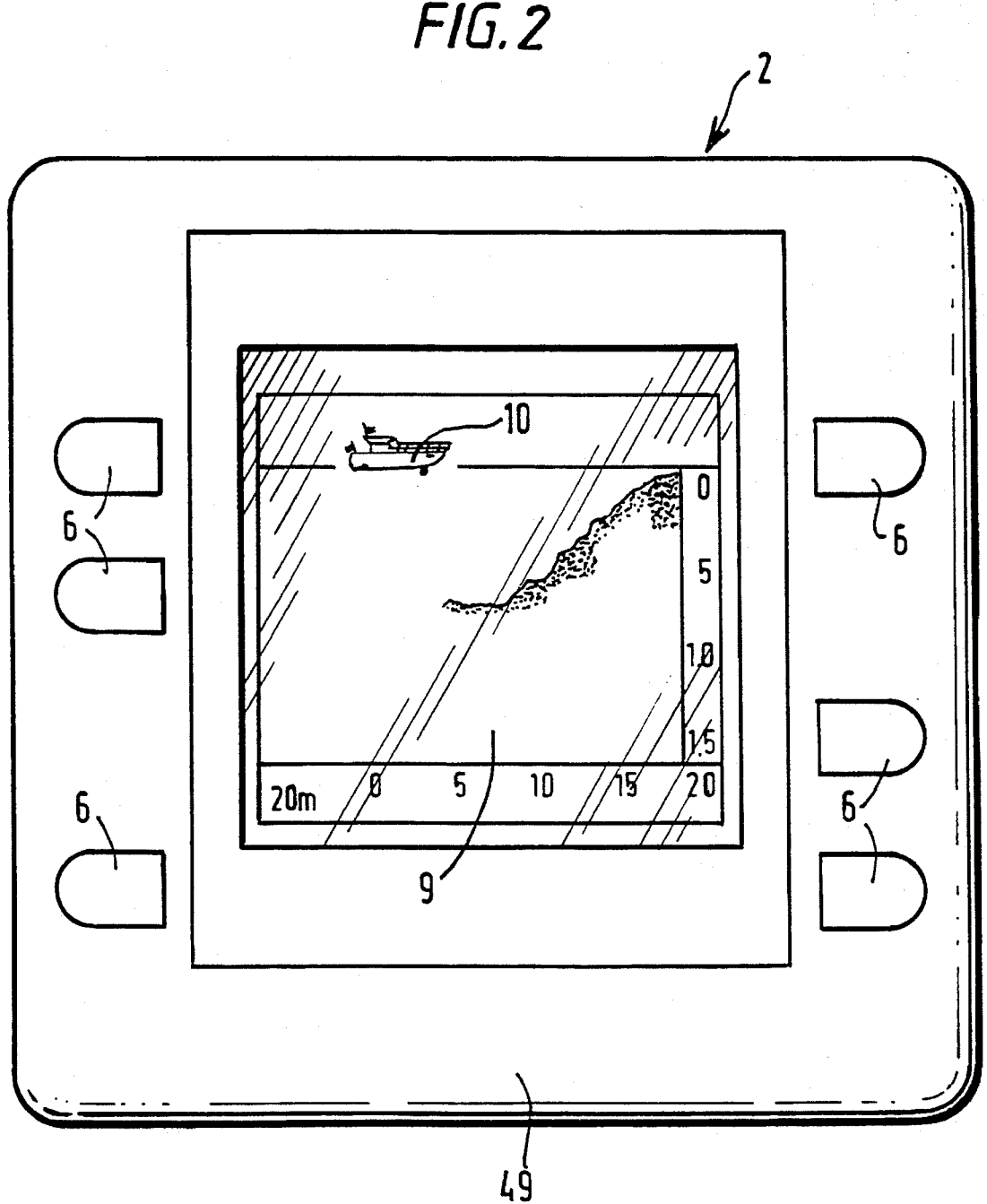
FIG. 2 is a view of the display device used in the embodiment.

The display device 2 as seen by an operator is shown in FIG. 2. The display device comprises a liquid crystal display 9 and operator input controls 6 mounted in a waterproof housing 49. The liquid crystal display 9 shows the submerged features which have reflected the sound pulses output from the transducer unit 1 in the correct position relative to a scale picture 10 of the boat 52 on which the echosounding apparatus is mounted. The operator input controls 6 allow an operator to change the characteristics of the information shown on the liquid crystal display 9 as will be described herein later.

Figure 3:
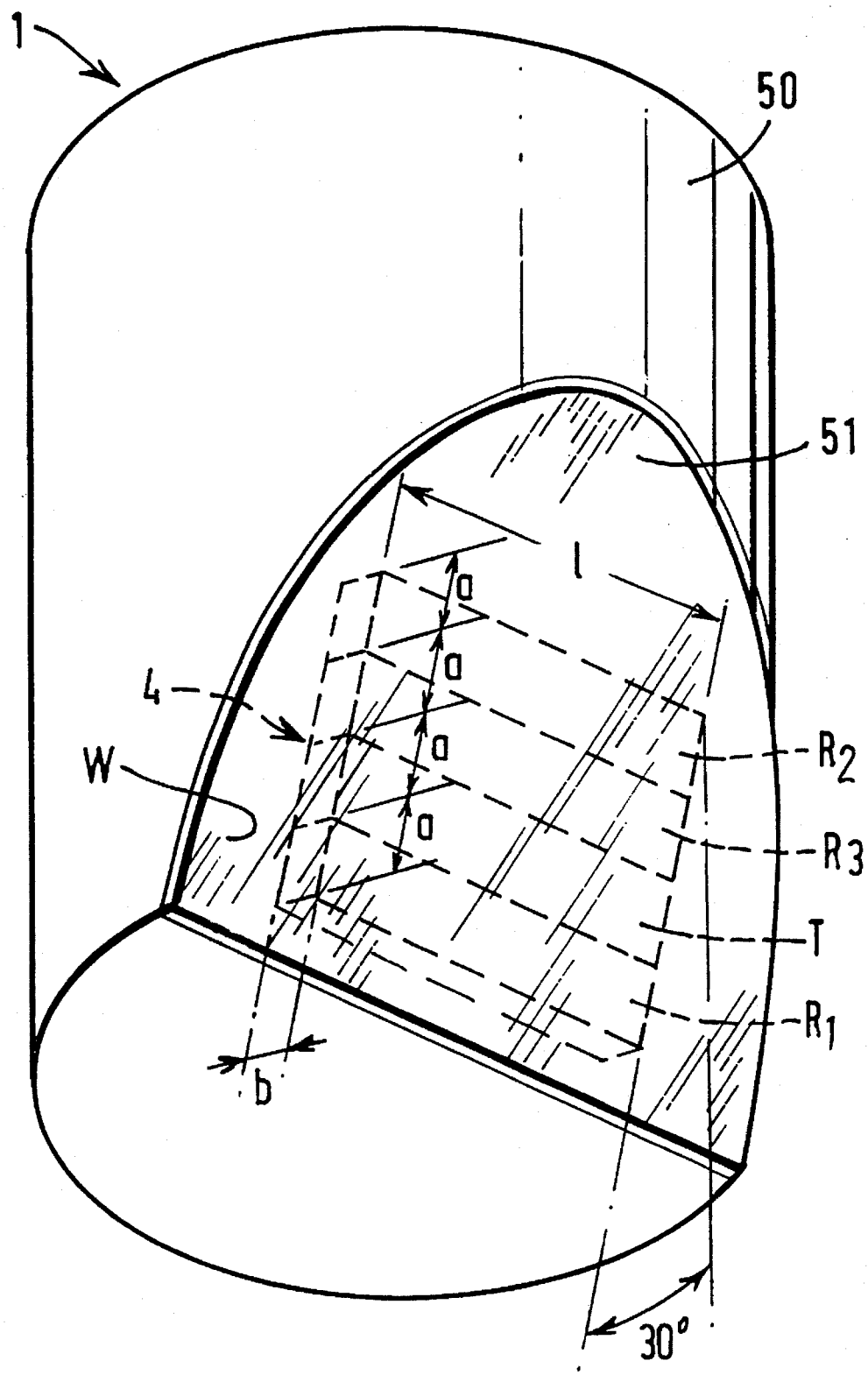
FIG. 3 is a perspective view of the transducer unit used in the embodiment.

The transducer unit 1 is shown in FIG. 3. The device comprises a block of transducers 4, consisting of four individual transducers R1, R2, R3 and T, mounted in a waterproof housing 50 which is configured as a hollow cylinder with a slice removed to create the plane 51 at 30° to the vertical, which is covered with a window W which is transparent to the transmitted and received sound pulses. The block of transducers 4 is glued to the inside surface of the window W using an acrylic resin compound. The housing 50 is filled with foam to acoustically isolate the transducers R1, R2, R3 and T from sound other than that entering through window W. The individual transducers are commercially available transducers in the form of rectangular blocks of piezoelectric material of length l (25 mm), width a (5 mm) and depth b which is specified so that the transducers are tuned to receive or transmit a frequency of 200 kHz. The depth b is dependent upon the specific material of the transducers. In the embodiment, the transducers are made from lead zircanate titanate (PZT). Transducers R1, R2 and R3 are receivers and transducer T is a transmitter. In the block of transducers 4, each individual transducer is separated from its neighbour by a strip of insulating material (not shown) so that all transducers in the block 4 are electrically and acoustically isolated from each other.

The transmitter T outputs sound pulses as described above and the reflected pulses are detected by all three receivers R1, R2 and R3. The signals from these receivers are then processed as will be described below.

Figure 4:
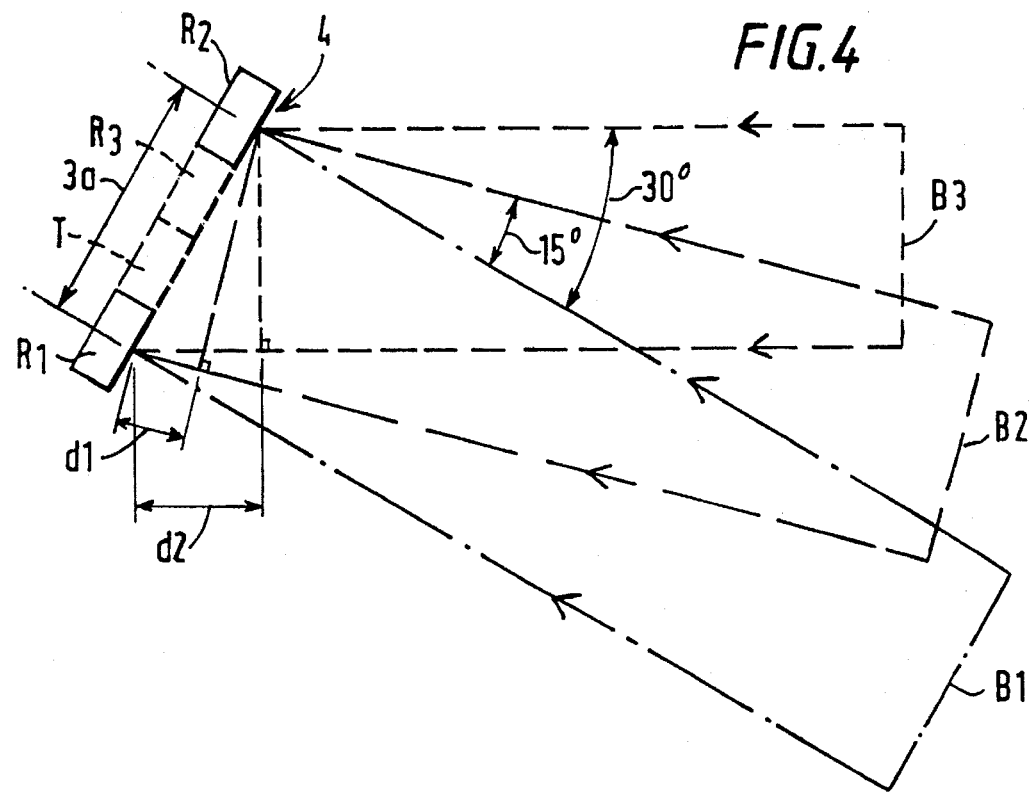
FIGS. 4 and 5 are schematic diagrams illustrating the principle of operation.
Figure 5:
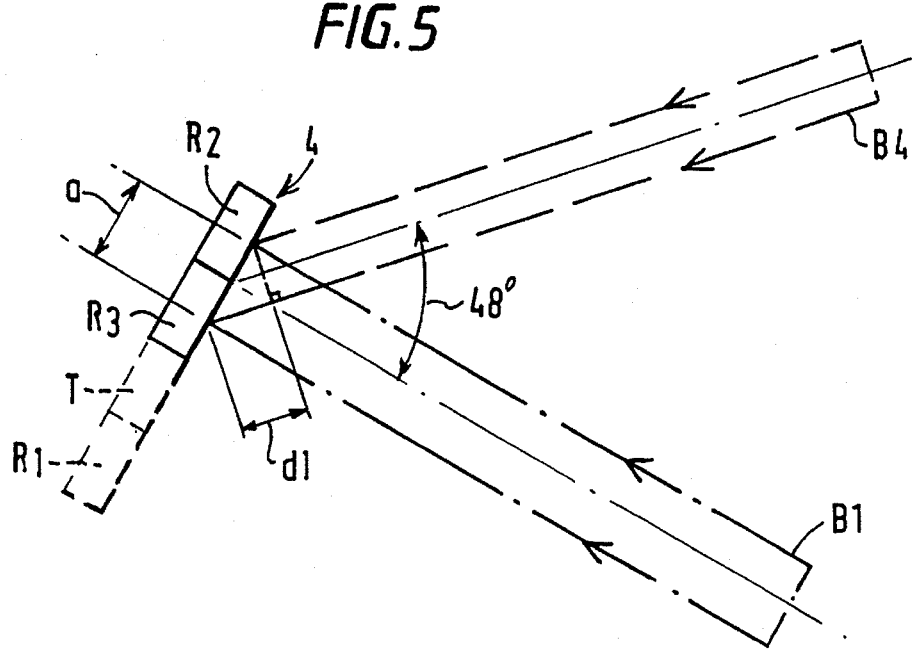

FIGS. 4 and 5 show enlargements of the block of transducers 4, indicating how reflected pulses are received. In particular and by way of example, FIG. 4 shows the pulses travelling to receivers R1 and R2 from the points Q5, Q6 and Q7 in FIG. 1 along paths B1, B2 and B3 respectively, while FIG. 5 shows the pulses travelling to receivers R2 and R3 from the points Q5 and Q9 along paths B1 and B4 respectively.

Referring to FIG. 4, the distance between the centres of receivers R1 and R2 is 3a, which corresponds to approximately two wavelengths (1.5 cm) of the transmitted and received pulses. The distance from the block of transducers 4 to any point on the seabed is much greater than the distance between R1 and R2. Thus, the pulse reflected from any given point is essentially received by R1 and R2 as a substantially plane wavefront (as shown in FIG. 4).

The pulses reflected from point Q5 on the seabed travelling along path B1 travel equal distances from Q5 to R1 and to R2, and thus the signals produced by R1 and R2 are in phase. The pulses from point Q6 travelling along path B2 are shown as travelling a distance d1 further to R1 than to R2, where distance d1 corresponds to one half wavelength of the received pulse. Thus, the signals produced by R1 and R2 are 180° out of phase. The pulses from point Q7 travelling along path B3 are shown travelling a distance d2 further to receiver R1 than to receiver R2, where d2 corresponds to one wavelength of the received pulse. Thus, the signals produced at R1 and R2 by pulses from point Q7 are 360° (0°) out of phase. Point Q9 (not shown in FIG. 4) is such pulses therefrom would travel one and a half wavelengths further to receiver R1 than to receiver R2 and thus the corresponding signals produced by these receivers would be 540° (180°) out of phase. Similarly, pulses from points Q4, Q3 and Q1 (not shown in FIG. 4) would travel further to receiver R2 than receiver R1. The pulses received from Q4, Q3 and Q1 would produce corresponding signals −180°, −360° (0°) and −540° (−180°) respectively out of phase.

It is clear from the above description that pulses from points Q5, Q7 and Q3 all produce signals at receivers R1 and R2 which are in phase (that is, there is a phase difference of 0°, 360° or −360° between the signals) This is illustrated in FIG. 6c, which shows how the phase angle (that is the difference in phase between the signals produced at R1 and R2) varies with the physical position angle of the reflecting feature (that is the direction of arrival, measured from line OQ5, of the pulses received by R1 and R2). For example, pulses from point Q6 which has a physical position angle of 15° produce signals at R1 and R2 which have a phase difference of 180°. In general, the extra distance d travelled by a reflected pulse to one receiver in the pair R1/R2 than the other receiver in the pair is given by the formula:

$$d = 3a \sin \theta$$

where $3a$ is the distance between the centres of receiving transducers R1 and R2 and θ is the physical position angle of the reflecting feature. Since, as stated previously, the distsance $3a$ between the centres of receiving transducers R1 and R2 is approximately two wavelengths ($2\Omega$) of the transmitted and received pulses, the formula can be expressed as:

$$S\Omega = 2\Omega \sin \theta$$

where $S\Omega$ is the value of d expressed in wavelengths of the transmitted and received pulses. To express the distance $S\Omega$ as a phase angle, $\phi R1 - \phi R2$, it is necessary to multiply it by 360 to give a value in degrees. Therefore:

$$\phi R1 - \phi R2 = S \times 360 = 2 \sin \theta \times 360$$

It is this relationship between phase angle $\phi R1 - \phi R2$ and physical position angle θ which is illustrated in FIG. 6c. Values of physical position angle shown in FIG. 6 are approximate values; for example, points Q4 and Q6 are shown in FIG. 6c at angles of −15° and 15° respectively, when the actual values given by the formula above are −14.48° and +14.48°.

From FIG. 6c, it can be seen that, for every point on the seabed between Q5 and Q6, there is a corresponding point between Q7 and Q9 that produces signals identical in phase difference (between 0° and 180°) at R1 and R2. By way of example, the corresponding signals produced by pulses from points q and q' shown in FIG. 6c at physical position angles of 5° and 36° respectively have the same phase difference, i.e. 63°. This situation arises because the phase angle varies from 0° to 360° as the reflecting point moves from Q5 to Q7, and then repeats itself as the reflecting point moves between Q7 and Q9. In addition, for every point between Q5 and Q6, there is a further corresponding point between Q4 and Q3 that produces signals identical in phase difference at R1 and R2. This is because phase angles between 0° and 180° cannot be distinguished from angles between −180° and −360°; for example 60° is equivalent to −300°.

Similarly for every point on the seabed between Q5 and Q4, there are corresponding points between Q3 and Q1 and between Q6 and Q7 which produce signals identical in phase difference at R1 and R2.

Thus, by determining the phase of the signals produced by pulses received at R1 and R2, three possible physical position angles are identified but it is not possible to determine which angle is the correct angle from which the reflected pulse has arrived. That is, there is directional ambiguity.

FIG. 6 also shows the relationships between phase angle and physical position angle for receiver pairs R1 and R3 (FIG. 6b) and R2 and R3 (FIG. 6a). In these figures the scale of the physical position angle axis is the same as that in FIG. 6c. However, reflected pulses from a feature at a given physical position angle do not produce the same phase angle in receiver pairs R1/R2, R1/R3 and R2/R3. In the case of receivers R1 and R3 (FIG. 6b), the distance $2a$ between the centres of the receivers is equivalent to one and one third wavelengths of the transmitted and received pulses, and hence the phase angle $\phi R1 - \phi R3$ related to the physical positional angle $\theta$ of the reflecting feature by the formula:

$$\phi R1 - \phi R3 = 4/3 \times \sin\theta \times 360$$

In the case of receivers R2 and R3 (FIG. 6a), the distance $a$ between centres of the receivers is equivalent to two thirds of a wavelength of the transmitted and received pulses, and hence the phase angle $\phi R3 - \phi R2$ is related to the physical position angle $\theta$ of the reflecting feature by the formula:

$$\phi R3 - \phi R2 = 2/3 \times \sin\theta \times 360$$

By way of example, the phase angles produced by reflected pulses from a point q at a physical position angle of 5° are illustrated in FIG. 6. As described previously with reference to FIG. 6c, the phase angle produced at reciever pair R1/R2 by pulses reflected from point q is 63°. FIG. 6b shows that the phase angle produced by pulses from point q at receiver pair R1/R3 is approximately 42°, while FIG. 6a shows that the phase angle produced at receiver pair R2/R3 is approximately 21°.

FIG. 6b shows the relationships between phase angle and physical position angle for receiver pair R1 and R3. In this case, there are two possible physical position angles for every determined phase angle: physical position angles between 0° and 22° produce equivalent phase angles to corresponding angles between −22° and −48° (since, as explained above, phase angles between 0° and 180° cannot be distinguished from angles between −180° and 360°) and similarly, physical position angles between 0° and −22° produce equivalent phase angles to corresponding angles between 22° and 48°. In the case of receiver pair R2 and R3 (FIG. 6 a), there is a unique relationship between phase angles and physical position angles. This will be described with reference to FIG. 5 below.

Referring to FIG. 5, the centres of receivers R2 and R3 are located as close together as is allowed by the physical width $a$ of each transducer. In the embodiment, the distance between the centres of the transducers $a$ is two thirds f one wavelength of the received signal. In FIG. 5, B1 indicates the path of pulses received from point Q5 on the seabed and B4 indicates the path of pulses received from point Q9 (if there is a reflective surface in direction B4; such a surface may arise for example if the boat pitches). Pulses travelling along path B1 travel equal distances to R2 and R3 and hence produce signals at these receivers that are in phase. Pulses travelling along path B4 are shown travelling a distance d1 further to receiver R3 than to receiver R2, where the extra distance d1 is the same as that travelled by pulses along path B2 in FIG. 4, and is equivalent to one half of a wavelength of the received pulses. Thus, the signals produced at R2 and R3 are 180° out of phase. The close spacing of receivers R2 and R3 in this case results in a large angle between paths B1 and B4. That is, there is a large angle between the zero phase difference path normal to the receivers and the first path which results in a phase difference of 180° (in the embodiment this angle is 48°). Similarly, pulses from point Q1 (not shown in FIG. 5) travel further to R2 than to R3 and result in signals with a phase difference of −180°. Thus, by comparing the phase of the signals produced by R2 and R3, it is possible to determine a unique point lying between Q1 and Q9 from which the reflected pulse has arrived; that is there is no angular ambiguity.

There is a limitation to the accuracy of the phase signals produced by any receiver transducer, which arises due to the finite width $a$ of the receiver transducer. A pulse may travel further to one edge of a receiver transducer than it does to the other edge of the same receiver transducer. A receiver transducer however, produces a single, averaged output signal and hence cannot compensate for this effect. This uncertainty creates a corresponding uncertainty in the phase difference calculated from signals from a pair of receivers. This in turn produces an inaccuracy in the calculated physical angle of the reflecting feature. FIGS. 4 and 5 show that in the case of the widely spaced receivers R1 and R2 (FIG. 4), the angle between the normal zero phase difference path (path B1) and the first 180° phase difference path (path B2) is much smaller than that between the corresponding paths (i.e path B1 and path B4) for the closely spaced transducers R2 and R3 (FIG. 5). In the embodiment, these angles are approximately 15° and 48° respectively. Thus, since the inaccuracy in the phase difference is the same in both cases, the position of a given point (even though there are three) determined from R1 and R2 is of higher angular accuracy than the point determined from R2 and R3. The angular accuracy of the points determined from a pair of receivers can be increased by increasing the separation of the two receivers (and hence decreasing the angle between the normal zero phase difference and first 180° phase difference paths).

In summary, in the embodiment, receivers R1 and R2 (the "fine" pair) define three possible feature locations with high angular accuracy, receivers R1 and R3 (the "medium" pair) define two possible feature locations with an angular accuracy which is high but less than the accuracy of receivers R1 and R2, and receives R2 and R3 (the "coarse" pair) define an unambiguous feature position with low angular accuracy.

In the embodiment, the unambiguous feature position, low angular accuracy signal from receivers R2 and R3 is used in conjunction with the high angular accuracy signal from receivers R1 and R2 defining three possible feature locations to identify a single unambiguous feature angular position with high angular accuracy. In a preferred embodiment, the signal from receivers R1 and R3 defining two possible feature locations with high angular accuracy is also used in conjunction with the signals from receivers R1 and R2 and R2 and R3 to improve the angular accuracy to which the single unambiguous feature angular position is determined and to reduce errors in the identification of such positions as will be described herein later.

The processing carried out in a preferred embodiment of the invention will now be described in detail with reference to FIGS. 7 to 10.

FIG. 7 is a block diagram of the echosounding apparatus. Receivers R1, R2 and R3 are connected to sample/hold devices 12 via amplifiers 11, the combination of a receiver (R1, R2 or R3), an amplifier 11 and a sample/hold device 12 forming a receiving "channel". Signals from the sample/hold devices 12 are passed through a multiplexer 13 and an analogue to digital converter 7 before being processed by a microprocessor 5. The microprocessor is connected to a memory 8, the operator input controls 6 and the dislay 9. The transmitting transducer T is connected to the microprocessor 5 via an amplifier 11 to be driven thereby. In a preferred embodiment, the microprocessor is a Siemens 166.

The operation of the components shown in FIG. 7 will now be described with reference to FIGS. 8, 9 and 10.

FIG. 8 is a flow chart of the steps involved in the operation of the apparatus, the first four steps (14 to 17) of which are illustrated in FIG. 9. At step 14, sound pulses 24 (FIG. 9) are transmitted. In this step, the microprocessor 5 drives the transmitter T via the associated amplifier 11 to output sound pulses 24 (FIG. 9 whose pulse length and pulse amplitude are set On the basis of the range r of the reflecting features, which the microprocessor 5 determines by monitoring the processed reflected pulses. In order to ensure that there is a sufficiently strong reflected pulse, the microprocessor 5 controls the transmitter T and amplifier 11 so that the transmitted pulse length and amplitude are increased as the range of the reflecting features increases. By way of example, a typical output pulse comprises approximately 200 cycles.

At step 15 in FIG. 8, the microprocessor 5 begins a sampling routine in which, at step 16 and after transmission of the sound pulse 24, a sampling window 25 (FIG. 9) is started and at step 17 samples of the reflected pulses are taken simultaneously at predetermined intervals 26 (FIG. 9) (for example 8.75 μs for a transmitted frequency of 200 kHz as will be described below) on all three receiving channels for the duration of the sampling window 25. These steps are effected under the control of the microprocessor 5, which activates the sample/hold devices 12 simultaneously so that samples of the pulses received by receivers R1, R2 and R3 are taken at the same time. The duration of the sampling window 25 is determined by the microprocessor 5 on the basis of the range of the reflecting features. For longer ranges, the duration is increased, allowing sufficient time for the reflected pulse to travel back to the receivers. The period (P) of the samples is set by the microprocessor 5 on the basis of the frequency of the transmitted signal. In the embodiment, a sampling technique is used which is described by Horiguchi in a paper entitled "A Digital Phase Delay Compensating Beam-Forming Scheme for Ultrasonic Imaging" published in the Japanese Journal of Applied Physics, Volume 27 (1988) Supplement 27-1, pages 15–217, which uses a sampling frequency lower than the Nyquist rate. In this technique, the signal is sampled at a rate of $4f/(2u+1)$, where f is the centre frequency of the narrow band signal and u is an integer. In the preferred embodiment, u is set equal to 3 so that a sample is taken every seven quarters of a wavelength, as shown in FIG. 9b.

At step 18 the samples are stored. The microprocessor 5 reads out the previous sample taken on each channel and held in the associated sample/hold device 12, passes is through a multiplexer 13 and an analgoue to digital converter 7, and stores all three samples in the memory 8.

This storage is illustrated schematically in FIG. 10 which shows the storage of n samples from signals on channel 1 (ie detected by receiver R1) which are labelled $R1_1$ to $R1_n$, n samples from signals on channel 2 (ie detected by receiver R2) which are labelled $R2_1$ to $R2_n$, and n samples from signals on channel 3 (ie detected by receiver R3) which are labelled $R3_1$ to $R3_n$. Samples taken at the same time but on different channels are stored so that they are effectively in the same memory "latch". For example, samples $R1_1$, $R2_1$ and $R3_1$ taken on channels R1, R2 and R3 respectively, are shown stored in latch 1 in FIG. 10. Thus, each memory latch records the samples which are taken at a set time after the transmission of the sound pulse 24. In this time, the sound pulse 24 has travelled to a feature, been reflected, and travelled back to the transducer unit 1. Each memory latch, therefore, corresponds to the range of the feature reflecting the pulses, the samples of which are stored in that particular latch. Successive latches are used to store successive sets of samples. For example, the second samples taken on each channel, $R1_2$, $R2_2$ and $R3_2$ are stored in latch 2 etc. Thus, samples of a pulse from the same reflecting feature are stored in adjacent latches. After a reflected pulse has been completely sampled, it is possible that there is a time delay before another reflected pulse is received on a given channel. In this case, during this period, the sample values stored in the latches may be zero or may have low values due to received background noise. By way of example, the samples in FIG. 10 are shown divided into three sets: samples 1 to L, samples L+1 to m, and samples m+1 to n. Samples 1 to L may represent samples 1 to n. Samples 1 to L may represent samples from a pulse reflected by a first feature, samples L+1 to m may have zero or low values corresponding to a period in which no reflected pulse was received, and samples m+1 to n may represent samples from a pulse reflected by a second feature. Since as described previously with reference to FIGS. 4 and 5 a reflected pulse may travel further to one reciever than to another depending upon the direction from which the pulse has been reflected, it is possible that the latches storing the samples of the pulse from one channel are not identical in start and finish positions to those storing the samples of the same pulse from another channel. For example, if receiver R1 receives a reflected pulse, the first sample may be stored in latch 1. If, however, the pulse travels further to receiver R2 than to receiver R1, the pulse may not be present at receiver R2 when the first sample is taken. Thus, sample $R2_1$ may be zero (or background noise) and the first pulse sample may not be stored until latch 2 is filled. It is also possible that a pulse reflected from two different features may arrive at the receiver during time periods which overlap each other. In this case, the portion of pulses which overlap in this way will combine with each other, and the sample value stored is also a combined value which may appear as noise.

The next steps shown in FIG. 8 are to stop the sampling window (step 19) and to process the stored samples (step 20). These steps are carried out by the microprocessor 5. After the sampling window has been stopped, the microprocessor 5 reads out the samples stored in the memory 8 and processes them to determine the angular position θ of the reflecting feature. This process is described in detail below. The remaining processes shown in FIG. 8 relate to the display of the results. Firstly, at step 21, the microprocessor 5 checks the values of the operator input controls 6 and at step 22 sets the display parameters accordingly. The input controls 6 allow the operator to make changes to: the contrast of the display; the range, units, boat type (selected by the operator from a library of shapes) and boat size shown on the display; and engage a "shallow alarm" facility, whereby an alarm is sounded if the depth of the water in front of the boat 52 falls below a threshold value. The operator may also "freeze" the display. At step 23 the results are then displayed. The microprocessor 5 reads the results out of the memory 8 and displays them on the display 9, as illustrated in FIG. 2, in which the location of each feature is shown relative to the boat. After displaying the processed data at step 23, the microprocessor 5 transmits another sound pulse (step 14) and the subsequent steps shown in FIG. 8 are repeated.

The processing by the microprocessor 5 of the stored samples to determine the angular position of the reflecting signal will now be described with reference to FIGS. 11 to 13.

FIG. 11 is an expansion of step 20, "process stored samples", in FIG. 8, showing a flow diagram of the steps involved in this operation. All steps are carried out by the microprocessor 5. At step 27 in FIG. 11, the moduli of successive pairs of samples in a given channel are added. Similarly, the moduli of corresponding samples in the other two channels are also added. Thus, for example, in FIG. 10, the microprocessor computes modulus $R1_1$+modulus $R1_2$, modulus $R2_1$+modulus $R2_2$ and modulus $R3_1$+modulus $R3_2$. At step 28, the result of each addition is checked to determine if it lies above a given threshold value. If all three results lie above the threshold then further processing is carried out. If any one or more of the results lies below the threshold then the samples are abandoned and the process is repeated for the next successive pair of samples. In this case, the microprocessor 5 computes modulus $R1_2$+modulus $R1_3$, modulus $R2_2$+modulus $R2_3$ and modulus $R3_2$+modulus $R3_3$. By adding the moduli of successive samples at step 27, an approximate value representative of the received pulse amplitude is obtained. Step 28 of ensuring that all three addition results lie above a given threshold is carried out so that particularly weak received pulses (for example which may represent secondary echos) are eliminated.

At step 29, each pair of samples is converted to a phase angle; $\phi_{R1}$ for channel R1, $\phi_{R2}$ for channel R2 and $\phi_{R3}$ for channel R3. This is carried out using the formula $\phi=\arctan(y/x)$, in which y is the second sample in the pair (e.g. $R2_2$) and x is the first sample in the pair (eg $R2_1$). Differences in phase angle are then calculated at step 30 as follows:

$\phi\text{-fine}=\phi_{R1}-\phi_{R2}$ $\phi\text{-medium}=\phi_{R1}-\phi_{R3}$ $\phi\text{-coarse}=\phi_{R3}-\phi_{R2}$ The calculated values of φ-fine, φ-medium and φ-coarse lie in the range −180° to 180°.

The phase difference between the signals produced by R1 and R2 is referred to as the φ-fine since, as described earlier, the angular position of a reflecting feature determined using this angle is of the highest angular accuracy. Similarly, the angular position determined from the phase difference between the signals produced by R3 and R2 is of the coarsest angular accuracy and that determined from signals produced by R1 and R3 is of medium angular accuracy relative to the other angles.

Absolute phase angles which are "normalised" (represented by α-fine and α-medium) are then calculated at step 31. This process will be described in detail later. Before this, the remaining processes in FIG. 11 will be described. The normalised absolute phase angles, α-fine and α-medium, represent phase angles that correspond to a unique physical angle (that is they are "absolute") and have also been "normalised" so that the angle lies within the range −180° to +180°. The difference between α-fine and α-medium is calculated at step 32 and the result tested to determine if it lies below a given threshold value. If the result lies above the threshold value, then no further processing is carried out, the data is abandoned and the first, and subsequent, steps in FIG. 11 are repeated for the next successive pair of samples. If the difference lies below the given threshold value, then further processing comprising steps 33 to 35 is carried out.

The comparison at step 32 of α-fine and α-medium in this way allows "ambiguous" signals to be disregarded. For example, if two points on the seabed have identical ranges from the centre of the block of transducers 4 but lie on different sides of the normal to the transducers (line OQ5 in FIG. 1), then receivers R1 and R2 will detect the reflected pulse from each point at the same time, and produce signals that are in phase. Thus, incorrectly, a single reflecting feature in the direction OQ5, OQ7 or OQ3 would be identified. The time of receipt of the reflected pulse by R1 and R3 (the "medium" pair) is different and a single angular position is determined. By taking the difference of α-fine and α-medium and not carrying out further processing if the result is above a threshold value (i.e the feature angular positions suggested by the two pairs of receivers are different by more than a given amount), problems of this nature are avoided.

At step 33, the average of α-fine and α-medium is calculated to give a value α-average. The average α-fine and α-medium is used to increase the accuracy of the physical position angle subsequently calculated.

At step 34, α-average is connected to a physical position angle θ. Since α-average was calculated at step 33 from α-fine and α-medium which are normalised absolute phase angles, α-average is converted to a physical position angle θ using the one to one relationship shown in FIG. 6a. This value of θ is stored in the memory 8 together with the range value r which, as described earlier, is determined by the microprocessor 5 from the memory latch in which the sample was stored, the latch number being indicative of the time of arrival of the reflected pulse. A check is then carried out at step 35 to determine if there are any remaining samples which have not been processed. If any such samples exist, then the steps shown in FIG. 11 are repeated for the next pair of successive samples. If all of the samples have been processed, then the microprocessor 5 effects the display processes described earlier with reference to FIG. 8, in which the values of range and physical position angle stored in the memory 8 are read out and displayed.

The calculation of the normalised absolute phase angles, α-fine and α-medium, will now be described with reference to FIG. 12, which is an expansion of step 31 "calculate normalised absolute phase angles α-fine and α-medium" in FIG. 11. The first step (step 36) in this conversion is to "quantise" the phase difference angle from the closely spaced receivers R2 and R3, that is φ-coarse. This is done by dividing the range range −180°, to +180°, in which values of φ-coarse may lie, into 31 bins of equal size (i.e. approximately 11.6°each). An integer value from −15 to 15 is assigned to the value of φ-coarse depending upon which bin it lies in.

φ-fine is then inspected at step 37 to determine if its sign is positive or negative. A look-up table (FIG. 13a) is then used at steps 38 and 39 to determine an "addition component". This addition component is based on the quantized value of φ-coarse. A different look-up table (54 or 55) is used depending upon whether the value of φ-fine is positive (54) or negative (55). The addition component is then added to φ-fine at step 40 to give an absolute phase angle, β-fine. The addition of this component to the phase angle from receivers R1 and R2 (φ-fine) has the effect of using the unambiguous physical angular position of the reflecting feature determined by the phase difference between narrowly spaced receivers R2 and R3 to establish exactly which one of the possible three feature angular positions suggested by φ-fine is the correct one. In this way, an absolute fine phase angle, β-fine, with a value lying between −540° and 540° is calculated.

This value is then "normalised" at step 41 by dividing it by three. The resultant normalised absolute phase angle, α-fine, then has a value which lies between −180° and 180°. At step 42, the microprocessor 5 stores this value in the memory 8.

The processes described above are then repeated at steps 43 to 48 in FIG. 12 for φ-medium. Different look up tables (56 and 57 in FIG. 13b) are used to those which are used for φ-fine. The absolute medium phase angle, β-medium, calculated by adding the addition component to φ-medium, has a value which lies in the range −360° to 360°. In order to normalise this value, therefore, it is divided by two at step 47 so that it lies in the range −180° to 180°. In this way, both α-fine and α-medium lie in the same range.

Having determined the range r and angular position φ of a reflecting feature as described above, the microprocessor 5 converts these polar coordinates to Cartesian coordinates (x, y) using the formulae:

$$x = r \cos(30 - \theta)$$

$$y = r \sin(30 - \theta)$$

Since features lying between points Q1 and Q5 are assigned a negative value of θ, while those lying between points Q5 and Q9 are assigned a positive value of θ, in the formulae above the value of θ added to 30° is either positive or negative depending upon the location of the reflecting feature.

The microprocessor 5 activates pixels of the liquid crystal display 9 corresponding to the Cartesian coordinates of the reflecting feature using a conventional pixel activation technique. The features are shown in a vertical cross section lying in the plane of the transmitted output pulses, as shown in FIG. 2.

In order to facilitate the presentation of range information to a human observer, a scale picture 10 representing the vessel to which the echosounding apparatus is attached is also shown on the display 9 at the correct physical location. Using the operator input controls 6, an operator can select the size of the representative picture to be a value which closely resembles that of the actual vessel.

Although certain methods of implementation have been described, it should be understood that there are a number of modifications which could be made. For example, in the preferred embodiment, the transmitting transducer T is located between receivers R1 and R3 (FIG. 3). It is possible for the transmitting transducer T to be located in any position, or for a receiving transducer (R1, R2 or R3) to be operated in a dual mode, acting as a transmitter as well. The dimensions and arrangement of the transducers may be changed to give different angles of divergence to the transmitted sound pulse and/or to vary the phase angles to those in the embodiment produced by different feature angular positions. In the embodiment, the receivers (R2 and R3) in the coarse pair are located as close together as the physical dimensions of the transducers allow. However, receivers R2 and R3 may be spaced apart provided that their separation is sufficiently small to allow an unambiguous feature location to be identified in the region of interest. Also in the embodiment described, the signal from receivers R1 and R3 (the medium pair) is utilised to improve accuracy and reduce errors, although the use of this signal is not essential.

It is possible to display information on the liquid crystal display 9 of features in a vertical plane perpendicular to the direction of motion of the boat. In this case, the 5° horizontal angular divergence of the transmitted pulse would be utilised.

It is also possible to arrange the block of transducers 4 such that the transmitted beam is rotated, for example through 90° to provide feature location information in a plane perpendicular to the direction of motion of the boat.

Further, it is possible to use the apparatus without the transmitting transducer T as a direction indicator in conjunction with a separate transmitting transducer for example mounted on a buoy, life jacket or land feature.

In such an arrangement, the transmitter on the buoy, life jacket or land feature may emit sound pulses of a given frequency and in a given sequence either constantly, periodically or upon "interrogation" by a signal which is output from a transmitter mounted on the boat 52.

It is also possible to arrange the apparatus to continue operating if transducer R1, which does not form part of the coarse pair, fails to work. In this case, the low accuracy unambiguous feature position determined from signals from transducers R2 and R3 would be displayed.

I claim:

1. Underwater direction detecting apparatus comprising:
   first transducer means comprising a first pair of transducers spaced apart relatively closely along a line, said first transducer means being responsive to received sound energy to produce first signals indicative of the direction of travel of said sound energy unambiguously but with relatively low angular accuracy;
   second transducer means comprising a second pair of transducers spaced apart relatively widely along said line, said second transducer means being responsive to received sound energy to produce second signals indicative of said direction with relatively high angular accuracy but ambiguity;
   a processor for deriving from said first and said second signals further signals defining said direction substantially unambiguously with relatively high angular accuracy.

2. Apparatus according to claim 1 comprising three transducers, a first and second of which constitute said first pair and the first and third of which constitute said second pair.

3. Apparatus according to claim 1, including third transducer means operable to produce third signals indicative of said direction with angular accuracy intermediate said relatively low and said relatively high angular accuracy but with ambiguity, said processor being responsive to said third signals to resolve ambiguities arising in said further signals as a consequence of receipt of sound energy simultaneously from two directions which are symmetrical with respect to a predetermined reference direction.

4. Apparatus according to claim 3, wherein said third transducer means comprises a third pair of transducers.

5. Apparatus according to claim 4, comprising three transducers, a first and second of which constitute said first pair and the first and third of which constitute said second pair, and wherein at least one of said third pair of transducers comprises one of said first, said second and said third transducers.

6. Apparatus according to claim 4, wherein said third pair of transducers is constituted by one of said first pair and one of said second pair.

7. Underwater echo sounding apparatus, comprising:

a transmitter for transmitting sound energy pulses;

transducer means for receiving said sound energy pulses after reflection from features whose direction is to be detected, said transducer means comprising (i) first transducer means having a first pair of transducers spaced apart relatively closely along a line, said first transducer means being responsive to received sound energy to produce first signals indicative of the direction of said features unambiguously but with relatively low angular accuracy, and (ii) second transducer means having a second pair of transducers spaced apart relatively widely along said line, said second transducer means being responsive to received sound energy to produce second signals indicative of said direction with relatively high angular accuracy but ambiguity; and a processor for (i) deriving from said first and said second signals further signals defining said direction substantially unambiguously with relatively high angular accuracy, and (ii) detecting the time delay between transmission of said sound energy pulses and receipt thereof by said transducer means and determining therefrom the range of said features.

8. Apparatus according to claim 7, wherein said transmitter is operable to transmit said sound energy pulses in diverging directions and said transducer means is operable for receiving sound energy pulses from said diverging directions.

9. Apparatus according to claim 7, wherein said transmitter includes a transmitting transducer positioned adjacent said transducer means.

10. Apparatus according to claim 7, wherein said transducer means are mounted within a housing having means for attachment thereof to a vessel such that said direction extends both forwardly of and below said vessel.

11. Apparatus according to claim 7 further comprising a display responsive to said further signals for producing a display representing the direction from which said sound pulses are received.

12. Apparatus according to claim 11, wherein said display is arranged for producing in real time a pictorial representation of the features whose range and direction are represented by said further signal.

13. Apparatus according to claim 12, wherein said pictorial representation includes a representation of a vessel carrying the apparatus, relative to positions of said features as indicated by said further signals.

14. Apparatus according to claim 13, wherein said representation of said vessel is in scale with the representation of said features.

15. Apparatus according to claim 7, wherein said processor is operable to sample signals produced by said transducer means and to store successive said samples in successive memory locations and to determine said range by reference to the storage locations of said samples.

16. Apparatus according to claim 7, wherein said processor is operable to produce said further signals by determining an angle as a function of the phase of the signals produced by said second transducer means and adding to said determined angle a further angle whose magnitude is determined by the phase of signals received by the first transducer means.

17. A method of determining the direction of travel of a received underwater sound signal comprising:

detecting the relative phases of said sound signal at a first pair of positions spaced relatively closely along a line and deriving therefrom a first indication of said direction which is unambiguous over a defined range of directions and of relatively low resolution;

detecting the relative phases of said sound signal at a second pair of positions spaced relatively widely along said line and deriving therefrom a second indication of said direction which is of relatively high resolution but ambiguous; and deriving from said first and said second indications further indications of said direction which are of relatively high resolution and substantially unambiguous over the defined range of directions.

18. A method according to claim 17, including transmitting a plurality of pulses of sound energy to provide a plurality of sound signals by reflection from features of interest.

19. A method according to claim 18, including determining the range of said features of interest by detecting the delay between transmission of said sound pulses and reception of said sound signals.

20. A method according to claim 17, further comprising the steps of:

detecting the relative phases of said sound signal at a third pair of positions spaced along said line at a distance intermediate the spacing of said first pair and the spacing of said second pair, and deriving therefrom a third indication of said direction with angular resolution intermediate said relatively low and said relatively high resolutions but with ambiguity; and using said third indication to resolve ambiguities arising in said further indications as a consequence of receipt of sound energy simultaneously from two directions which are symmetrical with respect to a predetermined reference direction.

21. Apparatus according to claim 7 comprising three transducers, a first and second of which constitute said first pair and the first and third of which constitute said second pair.

22. Apparatus according to claim 7, including third transducer means operable to produce third signals indicative of said direction with angular accuracy intermediate said relatively low and said relatively high angular accuracy but with ambiguity, said processor being responsive to said third signals to resolve ambiguities arising in said further signals as a consequence of receipt of sound energy simultaneously from two directions which are symmetrical with respect to a predetermined reference direction.

23. Apparatus according to claim 22 wherein said third transducer means comprises a third pair of transducers.

24. Apparatus according to claim 23, comprising three transducers, a first and second of which constitute said first pair and the first and third of which constitute said second pair, and wherein at least one of said third pair of transducers comprises one of said first, second and third transducers.

25. Apparatus according to claim 23, wherein said third pair of transducers is constituted by one of said first pair and one of said second pair.

26. Apparatus according to claim 1, wherein said transducer means is mounted within a housing having means for attachment thereof to a vessel such that said direction extends both forwardly of and below said vessel.

27. Apparatus according to claim 1, further comprising a display responsive to said further signals for producing a display representing the direction from which said sound pulses are received.

28. Apparatus according to claim 1, wherein said processor comprises a microprocessor operable to sample signals produced by said transducer means and to derive said further signals by determining from said samples the phases of said produced signals.

29. Apparatus according to claim 1, wherein said processor is operable to produce said further signals by determining an angle as a function of the phase of the signals produced by said second transducer means and adding to said determined angle a further angle whose magnitude is determined by the phase of the signals received by the first transducer means.

30. Apparatus according to claim 7, wherein outputs of the transducers of said first pair and outputs of the transducers of said second pair are sampled over a predetermined time interval, and wherein said first signals represent a phase difference of the sound energy between the transducers of the first pair measured over said time interval, and said second signals represent a phase difference between the transducers of the second pair over the same time interval.

31. Apparatus according to claim 30, wherein said phase differences are determined for each of a succession of time intervals after transmission of said pulse, each successive time interval corresponding to a greater range value.

32. Apparatus according to claim 30, wherein said transducer outputs are sampled only at the start and end of said time interval.

33. Apparatus according to claim 32, wherein the sample at the end of said time interval is used also as the sample at the start of a next time interval.

34. Apparatus according to claim 31, wherein said time interval is predetermined in accordance with a wave period of the transmitted sound energy pulse, so as to differ by one quarter of said period from an integer multiple of said period.

35. Apparatus according to claim 31, wherein the spacing between the centers of the second pair of transducers is three times the spacing between the centers of the first pair of transducers.

36. Apparatus according to claim 23, wherein the spacing between the centers of the second pair of transducers is three times the spacing between the centers of the first pair of transducers, and the spacing between the centers of the third pair of transducers is twice the spacing between the centers of the first pair of transducers.

* * * * *

UNITED STATES PATENT AND TRADEMARK OFFICE
CERTIFICATE OF CORRECTION

PATENT NO. : 5,530,680
DATED : June 25, 1996
INVENTOR(S) : Philip David Whitehurst It is certified that error appears in the above-indentified patent and that said Letters Patent is hereby corrected as shown below:

Column 13, line 3, change "are" to --is--.
Column 16, line 19, change "claim 31" to --claim 7--.

Signed and Sealed this

Twenty-second Day of October, 1996

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,530,680
DATED : June 25, 1996
INVENTOR(S) : Philip David WHITEHURST It is certified that error appears in the above-identified patent and that said Letters Patent is hereby corrected as shown below:

Column 13, line 48, change "are" to --is--.
Column 16, line 19, change "claim 31" to --claim 7--.

This certificate supersedes Certificate of Correction issued October 22, 1996.

Signed and Sealed this

Twenty-first Day of April, 1998

Attest:

BRUCE LEHMAN

*Attesting Officer*     *Commissioner of Patents and Trademarks*